Sept. 5, 1950     E. F. BORRELLI     2,520,905
SHEARS
Filed Oct. 1, 1946     4 Sheets-Sheet 1
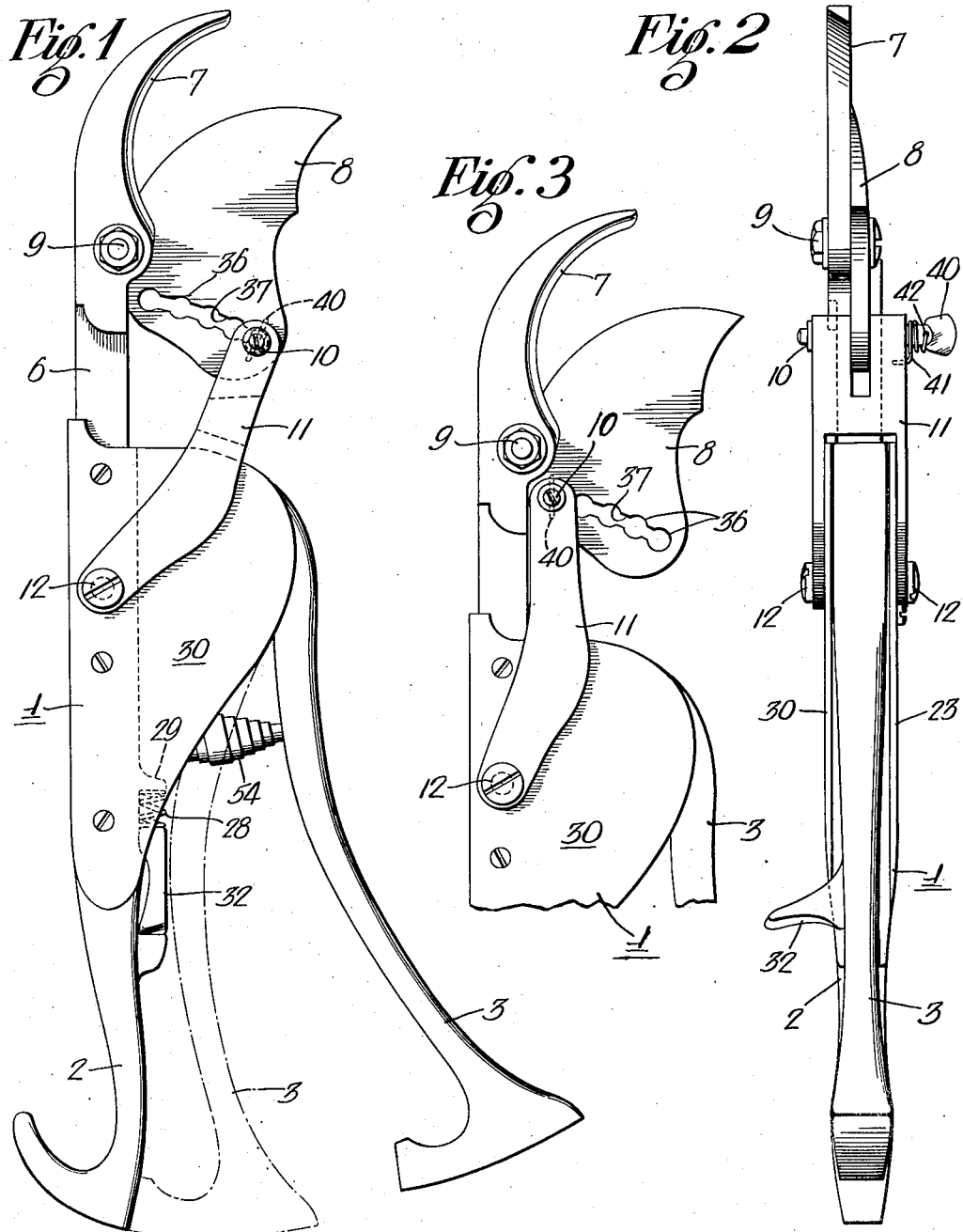
Inventor:
Elmer F. Borrelli
by his Attorneys
Howson & Howson

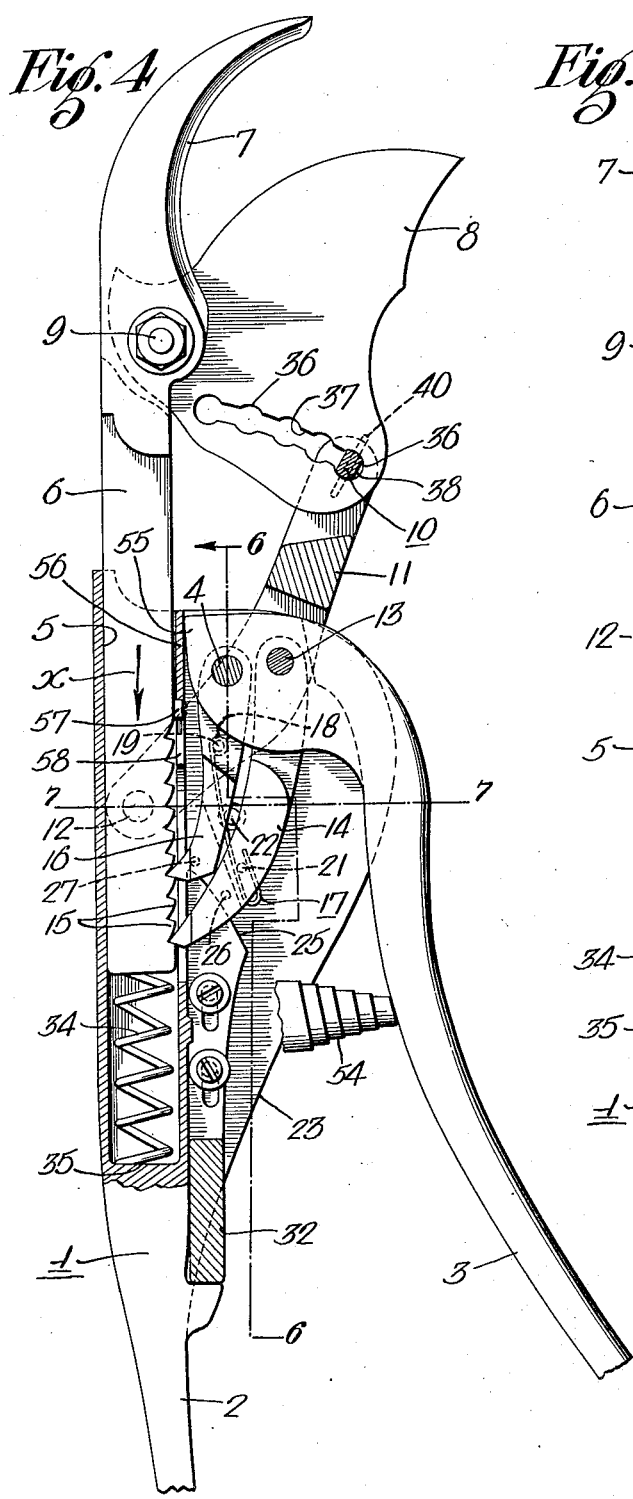

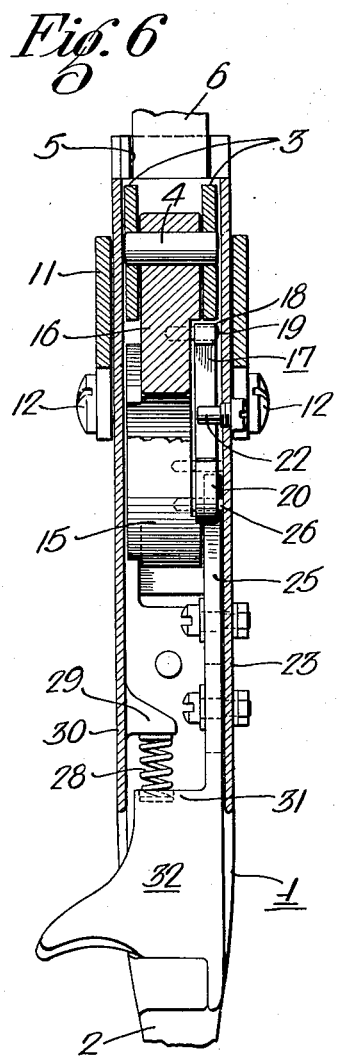
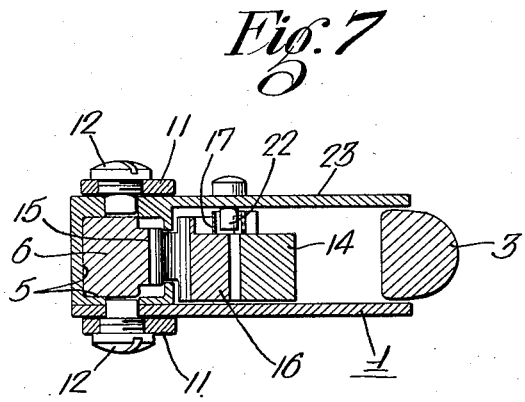
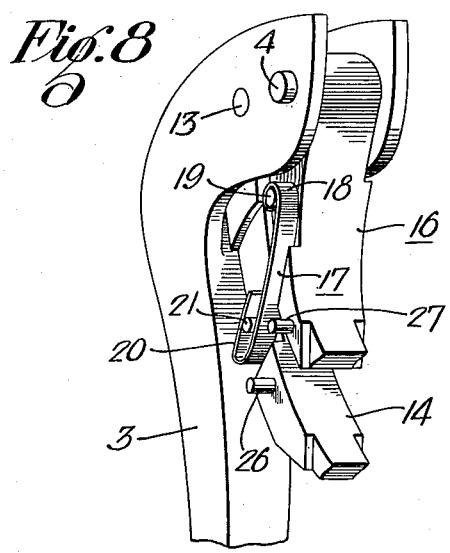
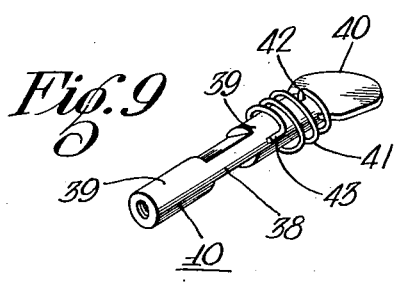

Sept. 5, 1950      E. F. BORRELLI      2,520,905
SHEARS
Filed Oct. 1, 1946      4 Sheets-Sheet 4
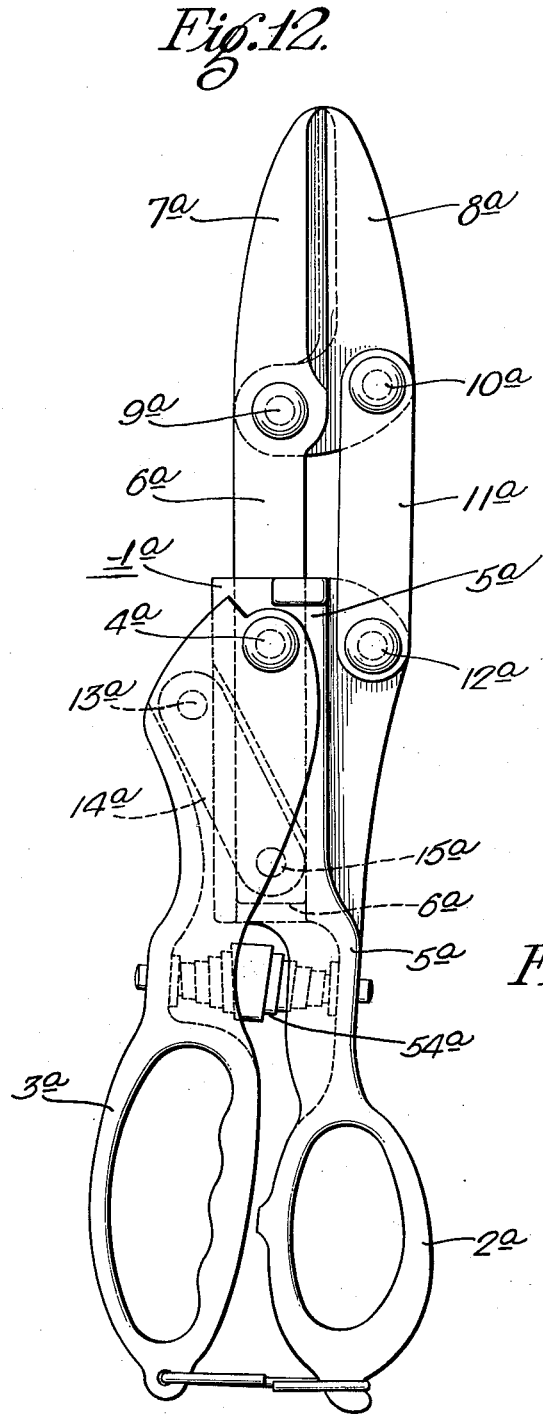
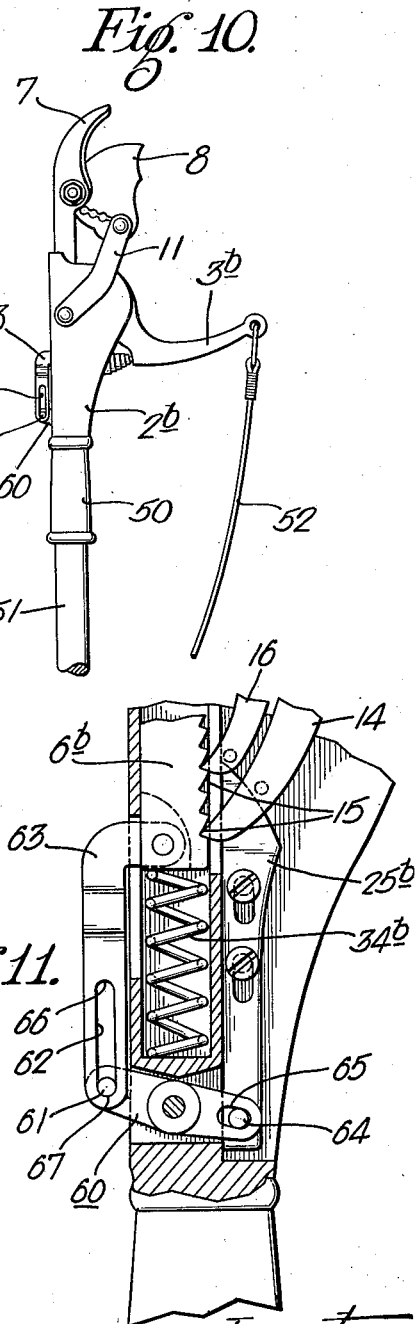
Inventor:
Elmer F. Borrelli
by his Attorneys
Howson & Howson Patented Sept. 5, 1950

2,520,905

UNITED STATES PATENT OFFICE 2,520,905

SHEARS

Elmer F. Borrelli, Philadelphia, Pa.

Application October 1, 1946, Serial No. 700,546

9 Claims. (Cl. 30—237)

This invention relates to hand operated shears capable of transversely cutting tree or shrub branches and various other kinds of rod-like materials of various cross sectional contours, diameters, and densities. The shears of the present invention, with slight modification, may also be used for cutting sheet metal and other sheet and strip materials.

The principal object of the present invention is to multiply the power transmitted to the cutting jaws of the shears through the levers which operate the shears without requiring any substantial increase in the hand power normally applied to the operating levers, whereby materials of greater densities, such as wire, nails and small metal rods, or tree limbs, etc., of relatively large diameters may be readily severed with equal facility.

The shears of the present invention operate on the ratchet-jack principle, with one of the jaws of the shears maintained in a substantially fixed position, except for a relatively small pivotal movement thereof about a movable center, while the second jaw of the shears is moved intermittently in one direction, to bring the jaws together, under tremendous power built up by intermittent movement of a ratchet mechanism operated by one of the shears' levers being oscillated with respect to the second of the shears' levers.

The construction and operation of the shears made in accordance with the principles of the present invention will be more fully disclosed hereinafter, reference being had to the accompanying drawings in which:

Fig. 1 is a side elevation of the shears in open position ready to receive a shrub or tree limb of relatively large diameter;

Fig. 2 is a plan view of the shears shown in Fig. 1;

Fig. 3 is a fragmentary side elevation showing the jaws set for cutting twigs or limbs of relatively small diameter;

Fig. 4 is a longitudinal sectional elevation with the jaws set substantially the same as in Fig. 1;

Fig. 5 is a fragmentary longitudinal sectional elevation showing the jaws in the closed position;

Fig. 6 is a sectional plan view taken on the line 6—6, Fig. 4;

Fig. 7 is a transverse sectional elevation taken on the line 7—7, Fig. 4;

Fig. 8 is a detached perspective view illustrating a pair of cooperating pawls of the ratchet mechanism by which the jaws are brought together for cutting purposes;

Fig. 9 is a detached perspective view of a detail of the invention;

Fig. 10 illustrates a modification of the invention showing the shears mounted on a reach pole;

Fig. 11 shows still another modification involving an automatic release for the ratchet mechanism at the end of a cutting cycle of the jaws; and Fig. 12 illustrates another modification showing the shears as adapted for cutting sheet materials.

As shown in the drawings, the shears comprise a frame 1 to which is integrally connected an operating lever 2. A second operating lever 3 is pivotally mounted in the frame 1 on a pivot pin 4. The levers 2 and 3 are spread apart by a compression spring 54. A toe 55 on the lever 3 is adapted to engage the upper side of a transverse plate 56 forming part of the frame 1, to limit the spread of the lever 3 with respect to the lever 2.

As shown in Fig. 7, the frame 1 is of a substantially U-shaped cross sectional construction providing a longitudinally extending guideway 5 for slidably supporting a ratchet bar 6.

One jaw 7 of the shears is preferably formed integrally with the bar 6 at one end thereof. The second jaw 8 of the shears is of a generally triangular contour and is pivoted at one corner about a pin 9 carried by the ratchet bar 6.

A second corner of the jaw or blade 8 of the shears is pivotally connected at 10 to one bifurcated end of a holding link 11. The second bifurcated end of the link 11 is pivotally connected, at 12, to each side of the frame 1.

Pivotally mounted on the pin 13 which is carried by the operating lever 3, in spaced relation with the pivot pin 4 of said operating lever, is an activating pawl 14 which is adapted to engage ratchet teeth 15 formed on the upper side of the slide bar 6, whereby, as the lever 3 is oscillated about its pivot 4, the pawl 14, through the teeth 15 on the bar 6, will advance the bar 6 in the direction of the arrow x, moving said bar longitudinally into the frame 1 and effecting a rocking motion of the blade 8 around its pivot 9, thereby causing a closing of the pivoted blade or jaw 8 with respect to the rigid blade or jaw 7 formed integral with the bar 6.

A holding pawl 16, which is pivotally mounted on the pivot pin 4 of the lever 3, drops into the ratchet teeth 15 as the bar 6 is moved in the direction of the arrow x by the activating pawl 14, as the outer end of the lever 3 is moved toward the outer end of the lever 2 of the shears.

The holding pawl 16 drops into the notches between the teeth 15 successively as the bar 6 moves in the direction of the arrow x and retains the bar 6 in the position to which it has been moved by the activating pawl 14.

By moving the lever 3 in the direction away from the lever 2, the activating pawl 14 is caused to slide idly over the teeth 15 in the bar 6, as the bar 6 is held stationary by the holding pawl 16, thus the pawl 14 gets a new purchase on the bar 6 for further advancing the bar 6 in the direction of the arrow x on the next movement of the lever 3 toward the lever 2.

In the foregoing manner, the bar 6 is intermittently moved longitudinally in the frame 1 and causes the knife jaws 7 and 8 to close in intermittent steps, thereby cutting deeper and deeper into the opposite sides respectively of any tree or shrub branch, etc., which may have been placed between the cutting edges of the knife jaws 7 and 8, while the jaws were in a fully open position.

The pawls 14 and 16 are tied together by a bow-spring 17 having an eye 18 at one end for reception of the pin 19 extending laterally from one side of the holding pawl 16. The opposite end of the bow-spring 17 is provided with a loop 20 into which projects a pin 21 which extends laterally from one side of the activating pawl 14. Intermediate the eye 18 and the loop 20, the body of the bow-spring 17 is engaged by a stud 22 carried by a side wall 23 of the frame 1, said stud flexing the spring 17 downwardly at its center to exert a downward force on the pawls 14 and 16 to cause the tips of the pawl to enter the notches formed between the teeth 15 of the bar 6 at all times.

In order to release the pawls 14 and 16 from the teeth 15 in the bar 6, a cam 25 which is slidably mounted in the frame 1, along one side of the bar 6, is adapted to engage a pair of release pins 26 and 27, which project laterally from one side of the pawls 14 and 16 respectively, when the cam 25 is moved in one direction parallel to the bar 6.

The cam 25 is constantly urged to move in the opposite direction, i. e., away from the pins 26 and 27, by a spring 28 compressed between an abutment lug 29 extending laterally from the side wall 30 of the U-shaped frame 1, and the butt end 31 of a finger release lug 32 extending in the opposite direction from one side of the cam plate 25.

As soon as the pawls 14 and 16 are released from the teeth 15 of the bar 6, said bar is moved outwardly from the frame 1 by a compression spring 34 confined in the frame 1 between the inner end of the bar 6 and an abutment 35 in the guideway 5 of the frame 1.

With the upper corner of the knife jaw 8 held in a substantially fixed position by the link 11, through the pin 10, and the lower corner of said blade jaw being pivoted at 9 to the bar 6, the outward longitudinal movement of the bar 6 by the spring 34 will rock the jaw 8 away from the jaw 7 and cause said jaws to open to their maximum extent, as determined by the position of the pin 10 relative to the pivot 9 of the jaw 8.

The outward movement of the bar 6 relative to the frame 1 is limited by a projection 57 on said bar operating in a slot 58 formed in the cross plate 56 of the frame 1. When said projection is in engagement with the outer end of said slot, one of the teeth 15 in the bar 6 is in proper position to be directly engaged by the tip of the operating pawl 14, whereby lost motion is avoided when the lever 3 is again operated to move the bar 6 inwardly with respect to the frame 1.

To vary the extent of maximum opening of the jaws 7 and 8, the jaw 8 is provided with a series of openings 36, 36 at different radial distances from the pivot 9 of said jaw for the accommodation of the pin 10 which pivotally connects the upper inner corner of the knife jaw 8 to the holding link 11.

The series of openings 36, 36 are connected by an arcuate slot 37 swung from the link pivot 12, said slot being of lesser width than the diameters of the openings 36, 36. The pin 10 is thinned and flattened, as at 38, to an extent slightly less than the width of the slot 37 while the full width of the cylindrical ends 39, 39 of said pin is retained in the flat 38, so that normally the width of the flat 38 lies across the slot 37 and keeps the pin 10 in a predetermined opening 36, but, by turning the pin substantially 90°, the flat 38 aligns with the slot 37 and permits the pin 10 to be moved into any one of the openings 36, 36 to change the leverage between the jaw pivot 9 and the pin 10.

Thus, the throw of the jaw 8 may be varied with respect to the uniform movement of the bar 6 for each uniform movement of the lever 3. As the pivot 10 is moved further away from the jaw pivot 9, the leverage for closing the jaw 8 is increased and vice versa, thus the power required to close the jaw 8 on a large tree branch, for example, is multiplied without requiring any additional power being applied to the lever 3 over the normal power required to cut a smaller branch.

For turning the pin 10, said pin is provided with a butterfly head 40, and for returning the pin 10 to its normal position relative to the slot 37, a torsion spring 41 is provided with one end 42 anchored to the pin 10 and its opposite end 43 riding in the slot 37.

If desired, the lever 2b may be provided with a socket 50, as shown in Fig. 10, to receive the upper end of a reach pole 51, for pruning tree branches, etc., beyond the normal reach of the person operating the shears; and the lever 3b may be provided with a pull cord 52 or the like, having its lower end located within the reach of the operator.

As shown in Fig. 11, the pawls 14 and 16 of the ratchet mechanism may be automatically released to permit the bar 6b to return to its outer position and reopen the jaws 7 and 8, when said jaws attain their fully closed position. For this purpose, a lever 60 may be pivoted, intermediate its opposite ends, in the frame 1, with a laterally projecting pin 61 in one end of the lever 60 adapted to extend into a slot 62 formed in one end of a link 63. The second end of the link 63 is pivoted in the inner end of the bar 6b.

The release cam slide 25b is provided with a pin 64 which projects into a slot 65 in the second end of the lever 60, so that, as the bar 6b receives its last inward movement in closing the jaws 7 and 8, the end 66 of the slot 62 engages the pin 61 in the one end of the lever 60 and rocks said lever to push the release cam 25b forward to lift the pawls 14 and 16 out of the notches between the teeth 15 in the bar 6b, whereupon the spring 34b will move the bar 6b outwardly and open the jaws 7 and 8.

The link 63 moves with the bar 6b, and as the bar 6b approaches the limit of its outward movement, the second end 67 of the slot 62 engages the pin 61 on the lever 60 and rocks said lever to pull the cam 25b from beneath the pawls 14 and 16, thereby permitting said pawls to drop again into the notches between the teeth 15 in the bar 6b.

When using the automatic release for the pawls 14 and 16, the spring 28, which normally returns the cam 25 to its normal position from beneath the pawls 14 and 16, is eliminated.

The shears may be modified slightly, as shown in Fig. 12, to cut sheet materials, and for this purpose the blades 7a and 8a are preferably made with straight cutting edges.

In this case, the bar 6a is connected directly to the lever 3a by a link 14a, so that the bar 6a will be longitudinally reciprocated and the jaws 7a and 8a will be opened and closed each time the lever 3a is moved toward the lever 2a by hand and is subsequently moved away from the lever 2a by the spring 54a. The holding link 11a is pivotally connected at 12a to the frame 1a, and at 10a to the jaw 8a, in spaced relation to the pivot 9a by which the jaw 8a is pivotally connected to the bar 6a. The lever 3a is pivotally connected to the frame 1a at 4a, while one end of the operating link 14a is pivotally connected at 13a to the lever 3a and at its opposite end to the bar 6a, at 15a. The bar 6a is slidably mounted in a guideway 5a formed in the frame 1a.

Obviously, if desired, the straight edge jaws 7a and 8a may have curved cutting edges the same as the jaws 7 and 8, in which case the shears shown in Fig. 12 could be used for tree and bush pruning and sever a branch completely through each time the lever 3a would be oscillated with respect to the lever 2a.

I claim:

1. A hand shear comprising a frame, a hand lever integral with said frame, a second hand lever pivoted to said frame, a ratchet bar slidable in said frame, a jaw integral with said bar, a second jaw pivoted to said bar, a holding link pivoted at one end to said frame, an adjustable pivot connection between the other end of said link and said second jaw in spaced relation to the jaw pivot, and ratchet means operable by said second hand lever for advancing said bar to close said jaws, said adjustable pivot connection being effective to vary the pivotal movement of the second jaw for each uniform advancing movement of said bar and to vary the leverage on said second jaw.

2. A hand shear comprising a frame, a hand lever integral with said frame, a second hand lever pivoted to said frame, a ratchet bar slidable in said frame, a jaw integral with said bar, a second jaw pivoted to said bar, a holding link pivoted at one end to said frame, an adjustable pivot connection between the other end of said link and said second jaw in spaced relation to the jaw pivot, and an operating pawl pivoted to said second hand lever in spaced relation to the second lever pivot with a free end of the pawl engageable with the ratchet teeth on said bar for advancing said bar to close said jaws, said adjustable pivot connection being effective to vary the pivotal movement of the second jaw for each uniform advancing movement of said bar and to vary the leverage on said second jaw.

3. A hand shear comprising a frame, a hand lever integral with said frame, a second hand lever pivoted to said frame, a ratchet bar slidable in said frame, a jaw integral with said bar, a second jaw pivoted to said bar, a holding link pivoted at one end to said frame, an adjustable pivot connection between the other end of said link and said second jaw in spaced relation to the jaw pivot, an operating pawl pivoted to said second hand lever in spaced relation to the second lever pivot with a free end of the pawl engageable with the ratchet teeth on said bar for advancing said bar to close said jaws, said adjustable pivot connection being effective to vary the pivotal movement of the second jaw for each uniform advancing movement of said bar, and to vary the leverage on said second jaw and a holding pawl pivoted in said frame with the free end thereof engageable with the teeth of the bar after each advance thereof by said operating pawl.

4. A hand shear comprising a frame, a hand lever integral with said frame, a second hand lever pivoted to said frame, a ratchet bar slidable in said frame, a jaw integral with said bar, a second jaw pivoted to said bar, a holding link pivoted at one end to said frame, an adjustable pivot connection between the other end of said link and said second jaw in spaced relation to the jaw pivot, an operating pawl pivoted to said second hand lever in spaced relation to the second lever pivot with a free end of the pawl engageable with the ratchet teeth on said bar for advancing said bar to close said jaws, said adjustable pivot connection being effective to vary the pivotal movement of the second jaw for each uniform advancing movement of said bar, and to vary the leverage on said second jaw a holding pawl pivoted in said frame with the free end thereof engageable with the teeth of the bar after each advance thereof by said operating pawl, and common release means carried by said frame for releasing both of said pawls from the teeth on said bar.

5. A hand shear comprising a frame, a hand lever integral with said frame, a second hand lever pivoted to said frame, a ratchet bar slidable in said frame, a jaw integral with said bar, a second jaw pivoted to said bar, a holding link pivoted at one end to said frame, an adjustable pivot connection between the other end of said link and said second jaw in spaced relation to the jaw pivot, an operating pawl pivoted to said second hand lever in spaced relation to the second lever pivot with a free end of the pawl engageable with the ratchet teeth on said bar for advancing said bar to close said jaws, said adjustable pivot connection being effective to vary the pivotal movement of the second jaw for each uniform advancing movement of said bar, and to vary the leverage on said second jaw a holding pawl pivoted in said frame with the free end thereof engageable with the teeth of the bar after each advance thereof by said operating pawl, common release means carried by said frame for releasing both of said pawls from the teeth on said bar, and spring means for moving said bar in an opposite direction to reopen said jaws.

6. A hand shear comprising a frame, a hand lever integral with said frame, a second hand lever pivoted to said frame, a ratchet bar slidable in said frame, a jaw integral with said bar, a second jaw pivoted to said bar, a holding link pivoted at one end to said frame and at its opposite end to said second jaw in spaced relation to the jaw pivot, ratchet means operable by said second hand lever for advancing said bar to close said jaws, a pin for effecting the pivotal connection between said link and said second jaw, said second jaw having a series of openings at various distances from said jaw pivot for reception of said pin to vary the pivotal movement of the second jaw for each uniform advancing movement of the bar.

7. A hand shear comprising a frame, a hand lever integral with said frame, a second hand lever pivoted to said frame, a ratchet bar slidable in said frame, a jaw integral with said bar, a second jaw pivoted to said bar, a holding link pivoted at one end to said frame and at its opposite end to said second jaw in spaced relation to the jaw pivot, ratchet means operable by said second hand lever for advancing said bar to close said jaws, a pin for effecting the pivotal connection between said link and said second jaw, said second jaw having a series of openings at various distances from said jaw pivot for reception of said pin to vary the pivotal movement of the second jaw for each uniform advancing movement of the bar, said second jaw having a slot connecting said series of openings and said pin having a flat sided portion of less thickness than the normal diameter of said pin to slide in said slot from one opening to another.

8. A hand shears comprising a frame, a lever pivoted to said frame, a bar slidable in said frame, a jaw fixed on said bar, a second jaw pivoted on said bar, a holding link having one end pivoted to said frame, an adjustable pivot connection between the other end of said link and said second jaw in spaced relation to the jaw pivot on the bar, ratchet mechanism operable by said lever to actuate said bar in said frame and thus actuate said second jaw, said adjustable pivot connection being effective to vary the pivotal movement of the second jaw for each uniform advancing movement of said bar and to vary the leverage on said second jaw, a pole having one end attached to said frame, and a pull element attached to said lever and lying adjacent said pole.

9. A shears comprising a frame, a bar slidably mounted in said frame, a lever pivoted to said frame, means operable by said lever to slide said bar in said frame, a jaw fixed to said bar, a second jaw pivoted to said bar, a link pivoted at one end to said frame, and an adjustable pivot connection between the other end of said link and said second jaw in spaced relation to the pivot of said second jaw on said bar, said adjustable pivot connection being effective to cause different closing movements of said second jaw in response to actuation of said lever and to vary the leverage on said second jaw.

ELMER F. BORRELLI.

REFERENCES CITED

The following references are of record in the file of this patent:

UNITED STATES PATENTS

| Number | Name | Date |
|---|---|---|
| 122,753 | Beigh | Jan. 16, 1872 |
| 1,023,093 | Ottinger | Apr. 9, 1912 |
| 1,214,473 | Jenner | Jan. 30, 1917 |
| 1,531,688 | Bush | Mar. 31, 1925 |
| 1,814,790 | Edwards | July 14, 1931 |
| 1,967,960 | McMemar | July 24, 1934 |